United States Patent
Maekawa et al.

(10) Patent No.: US 7,724,686 B2
(45) Date of Patent: May 25, 2010

(54) COMMUNICATION MONITORING APPARATUS, COMMUNICATION MONITORING METHOD, COMMUNICATION MONITORING PROGRAM, AND RECORDING MEDIUM

(75) Inventors: Myrine Maekawa, Saitama (JP); Kinya Ono, Saitama (JP)

(73) Assignee: Pioneer Corporation, Tokyo (JP)

( * ) Notice: Subject to any disclaimer, the term of this patent is extended or adjusted under 35 U.S.C. 154(b) by 261 days.

(21) Appl. No.: 11/909,929

(22) PCT Filed: Feb. 27, 2006

(86) PCT No.: PCT/JP2006/303568

§ 371 (c)(1),
(2), (4) Date: Oct. 29, 2007

(87) PCT Pub. No.: WO2006/103857

PCT Pub. Date: Oct. 5, 2006

(65) Prior Publication Data

US 2008/0198758 A1 Aug. 21, 2008

(30) Foreign Application Priority Data

Mar. 29, 2005 (JP) ............................. 2005-096484

(51) Int. Cl.
*G01R 31/08* (2006.01)
*G06F 13/00* (2006.01)
(52) U.S. Cl. .................. 370/252; 710/100; 710/305
(58) Field of Classification Search ................ None
See application file for complete search history.

(56) References Cited

U.S. PATENT DOCUMENTS

| 6,157,972 | A  | * | 12/2000 | Newman et al. ............ 710/100 |
| 6,909,699 | B2 |   | 6/2005  | Masunaga et al. |
| 7,180,857 | B2 | * | 2/2007  | Kawakami et al. .......... 370/231 |
| 2002/0105977 | A1 |   | 8/2002  | Masunaga et al. |
| 2002/0176436 | A1 | * | 11/2002 | Salloum Salazar .......... 370/431 |
| 2003/0110276 | A1 | * | 6/2003  | Riddle ........................ 709/230 |
| 2004/0258004 | A1 | * | 12/2004 | Brocke et al. ............... 370/254 |

FOREIGN PATENT DOCUMENTS

| JP | 5-11588 U | 2/1993 |
| JP | 10-285236 A | 10/1998 |
| JP | 11-331214 A | 11/1999 |
| JP | 2000-101614 A | 4/2000 |
| JP | 2002-9796 A | 1/2002 |
| JP | 2002-217928 A | 8/2002 |

* cited by examiner

*Primary Examiner*—Nittaya Juntima
(74) *Attorney, Agent, or Firm*—Foley & Lardner LLP

(57) ABSTRACT

A communication monitoring apparatus (100) monitors a network (130) to which a plurality of devices are connected with an IEEE1394 serial bus. An obtaining unit (111) obtains information that concerns a communication control parameter that is determined or managed by another device on the network. A determining unit (112) determines whether the information that concerns a communication control parameter is compatible with the network (130) based on the information that concerns a communication control parameter that is obtained by the obtaining unit (111). A reporting unit (113) reports a result of determination by the determining unit (111).

13 Claims, 8 Drawing Sheets

COMMUNICATION MONITORING APPARATUS, COMMUNICATION MONITORING METHOD, COMMUNICATION MONITORING PROGRAM, AND RECORDING MEDIUM

TECHNICAL FIELD

The present invention relates to a communication monitoring apparatus, a communication monitoring method, a communication monitoring program, and a recording medium that monitor a communication state of a network. However, the application of the present invention is not limited to the communication monitoring apparatus, the communication monitoring method, the communication monitoring program, and the recording medium.

BACKGROUND ART

Conventionally, as an interface mainly for the transfer of multimedia data, a serial bus compliant with the IEEE1394 standard (hereinafter, "IEEE1394 bus") has been used. The IEEE1394 bus has such characteristics that high-speed data transfer is possible, a device to be a host is not required, and connection and disconnection can be freely performed even during the operation of a device. The IEEE1304 standard includes IEEEE1394-1995 that has conventionally been used, IEEE1304a, and IEEE1394b that is obtained by improving IEEE1394a.

According to the IEEE1394 standard, there is idle time (Gap) during which no device (node) connected thereto can perform communication, and a value to be an origin of the idle time is Gap_Count. For example, when data is transmitted from one node to another node that is connected to the same 1394 bus, it is necessary to send back an acknowledge packet (ACK) to confirm whether the data is properly received at the receiving end. During the period from the data transmission until reception of ACK, other devices cannot disturb the communication, and are required to wait for a certain period of time.

This waiting time is called ACKnowledge_Gap, and the time indicating ACKnowledge_Gap is determined based on the value of Gap_Count. A Gap_Count value varies according to a topology of a bus, and when a topology of a bus is changed, the Gap_Count value is re-set in each node. The setting of Gap_Count is performed by a node that is a bus manager on the bus, or by an IRM (isochronous resource manager) if the bus manager is not present on the bus. A node that thus sets Gap_Count is referred to as a Gap_Count setting node, hereinafter.

The Gap_Count setting node calculates a Gap_Count value, and broadcasts a packet (PHY configuration packet) to set the calculated Gap_Count value in each node. Each node sets the received Gap_Count value in a PHY register. Upon each node receiving a bus reset signal, the Gap_Count value that is set in the PHY register becomes effective.

If Gap_Count is not appropriately set, for example, when the Gap_Count value is too small, there is a possibility that other nodes may start communication before ACK is received. Accordingly, the operation of the bus becomes unstable. On the other hand, when the Gap_Count value is too large, other nodes wait more than necessary. Accordingly, throughput of the device is lowered. Therefore, a technique of determining whether Gap_Count is set appropriately by checking whether a Gap_Count set in each node takes an equal value has been devised (for example, Patent Documents 1 and 2 below).

Patent Document 1: Japanese Patent Laid-Open Publication No. H10-285236
Patent Document 2: Japanese Patent Laid-Open Publication No. H11-331214

DISCLOSURE OF INVENTION

Problem to Be Solved by the Invention

However, according to the above conventional technique, although it is possible to check whether the same Gap_Count value is set in all of the nodes, it is impossible to determine whether normal data communication can be performed with the set Gap_Count value. For example, in a network (hereinafter, "1394 mixed network") that is formed with nodes based on IEEE1394b and that includes at least one node based on any one of IEEE1394-1995 and IEEE1394a, there is a possibility that a Gap_Count calculation method that is compatible only with IEEE1394-1995 or IEEE1394a is used when a node other than the nodes based on IEEE1394b is the Gap_Count setting node.

The Gap_Count calculation method that is compatible only with IEEE1394-1995 or IEEE1394a is a calculation method based on the number of hops (the number of cables used on a route between two nodes), a method in which a value is declared as a fixed value in advance, or the like. For example, in the calculation method based on the number of hops, the number of hops of the longest path (route) on the bus is acquired and Gap_Count corresponding to the number of hops is referred from a chart (hereinafter, "Gap_Count table").

Gap_Count is acquired from a propagation time when data is transmitted using the longest path. For IEEE1394-1995 and IEEE1394a, there is such a limit that the length of a cable is up to 4.5 m, and further, a type of a cable to be used is limited. Therefore, it is possible to determine the propagation time when data is transmitted with one hop as a fixed value. Accordingly, Gap_Count can be calculated for each number of hops, and the Gap_Count table can be created.

When a bus reset occurs, the Gap_Count setting node checks the number of hops of the longest path in the connection, and refers to the Gap_Count that corresponds to the number of hops from the Gap_Count table to set Gap_Count in each node. However, this table is created on condition that only nodes based on IEEE1394-1995 and IEEE1394a are present on the bus, and a node based on IEEE1394b is not taken into account. Therefore, a problem in that Gap_Count cannot be appropriately set in the 1394 mixed network is cited as an example.

In addition, since a node based on IEEE1394b is also present on the bus in the 1394 mixed network, it is not necessarily the case that "the longest path"="the path having the most hops". Even if "the longest path"="the path having the most hops" is by chance true, since the Gap_Count table is created on condition that paths are formed only with IEEE1394-1995 and IEEE1394a, it is highly possible that values are different from Gap_Count when a node based on IEEE1394b is present in a path. In the 1394 mixed network, a problem in that an improper Gap_Count value is set is cited as an example.

Moreover, if the network continues to be used with the improper Gap_Count thus set, problems such as the operation of the network becoming unstable or the throughput of the device decreasing are cited as examples.

To solve the problems in the conventional technique described above, it is an object of the present invention to provide a communication monitoring apparatus, a communication monitoring method, a communication monitoring program, and a recording medium that can prevent an improper communication control parameter to be set.

Means for Solving Problem

To solve the above problems and achieve an object, a communication monitoring apparatus according to an embodiment of the invention monitors a network to which a plurality of devices are connected with an IEEE1394 serial bus, and includes an obtaining unit that obtains information that concerns a communication control value that is determined or managed by another device on the network; a calculating unit that calculates a communication control value that is compatible with the network; a determining unit that determines, by comparing the communication control value that is calculated by the calculating unit and the information that concerns a communication control value and is obtained by the obtaining unit, whether the information that concerns a communication control value is compatible with the network; and a reporting unit that reports a result of determination by the determining unit.

Further, a communication monitoring method according to an embodiment of the invention monitors a network to which a plurality of devices are connected with an IEEE1394 serial bus and includes obtaining information that concerns a communication control value that is determined or managed by another device on the network; determining, by comparing the communication control value that is calculated by the calculating unit and the information that concerns a communication control value and is obtained by the obtaining unit, whether the information that concerns a communication control value is compatible with the network; and reporting a result of determination at the determining.

Moreover, a communication monitoring program according to an embodiment of the invention causes a computer to execute the communication monitoring method.

Furthermore, a computer-readable recording medium according to an embodiment of the invention stores therein the communication monitoring program.

EXPLANATIONS OF LETTERS OR NUMERALS

100 Communication monitoring apparatus
111 Obtaining unit
112 Determining unit
113 Reporting unit
114 Calculating unit
115 Device identifying unit
116 Disconnecting unit
121 IEEE1394b compatible device
122 IEEE1394b incompatible device
130 Network

BEST MODE(S) FOR CARRYING OUT THE INVENTION

Exemplary embodiments of a communication monitoring apparatus, a communication monitoring method, a communication monitoring program, and a recording medium are explained in detail below with reference to the accompanying drawings.

Embodiment (Functional Configuration of Communication Monitoring Apparatus 100)

Figure 1:
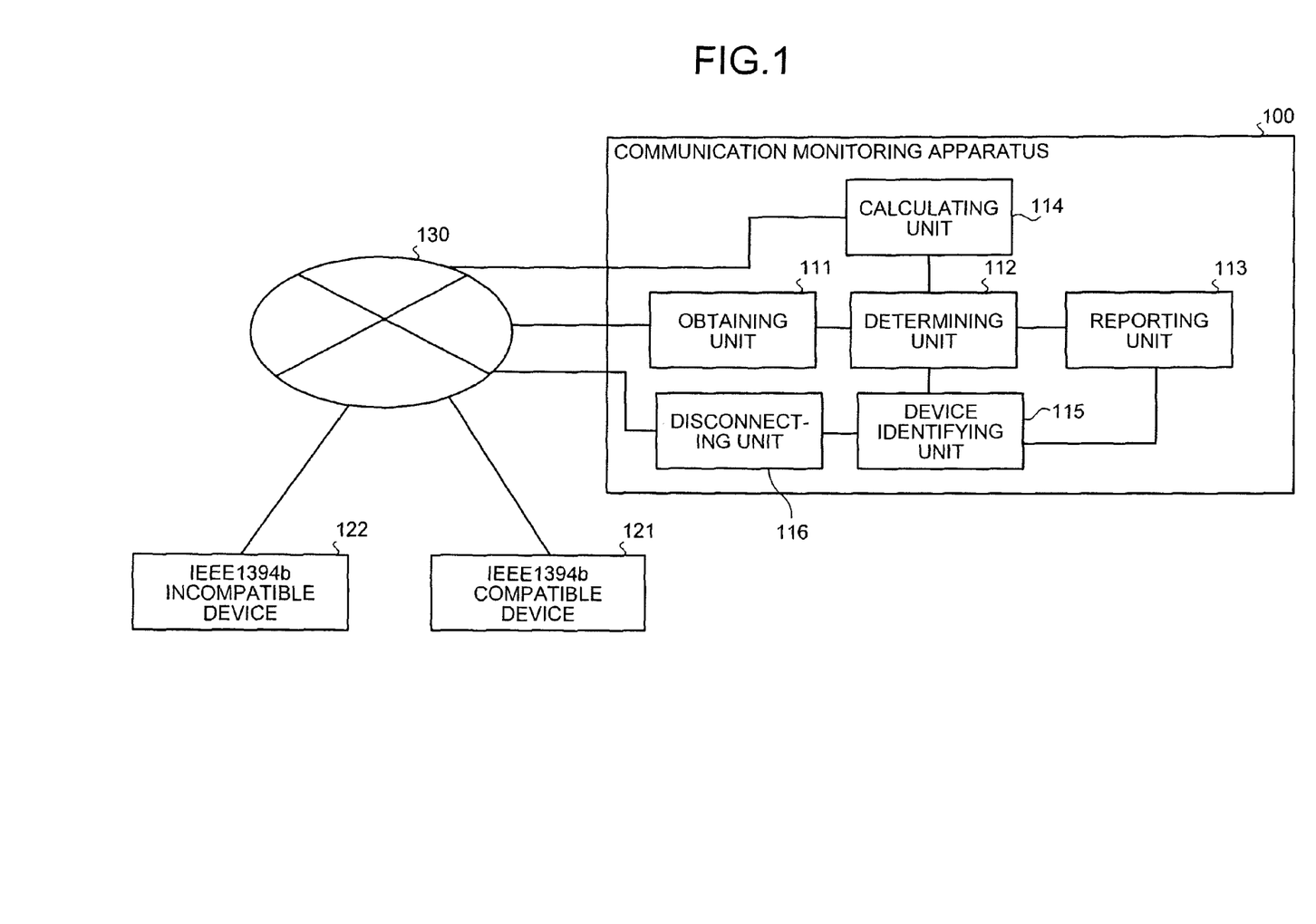
FIG. 1 is a functional block diagram of a communication monitoring apparatus according to an embodiment.

FIG. 1 is a functional block diagram of a communication monitoring apparatus according to an embodiment. A communication monitoring apparatus 100 according to the embodiment monitors a network to which a plurality of devices is connected with an IEEE1394 serial bus. A network 130 is a 1394 mixed network, and at least one IEEE1394b compatible device 121 and at least one IEEE1394b incompatible device 122 are connected thereto. The communication monitoring apparatus 100 includes an obtaining unit 111, a determining unit 112, a reporting unit 113, a calculating unit 114, a device identifying unit 115, and a disconnecting unit 116.

The obtaining unit 111 obtains information concerning a communication control parameter that is determined or managed by another device on the network 130. The information concerning a communication control parameter includes information concerning a Gap_Count value of the network 130, information concerning whether a PHY packet that is transmitted to set a Gap_Count value is issued, information concerning whether a Self_ID packet in which a Gap_Count value is described is issued, information concerning whether a Ping packet to urge issuance of the Self_ID is issued, device information of a Gap_Count setting node (including information indicating whether the Gap_Count setting node is compatible with IEEE1394b), and the like. Moreover, the information concerning a communication control parameter includes a communication control parameter itself as well.

The determining unit 112 determines whether the information concerning a communication control parameter is compatible with the network 130 based on the information concerning a communication control parameter obtained by the obtaining unit 111. The determining unit 112 determines that the information concerning a communication control parameter is not compatible with the network 130, for example, when the communication control parameter is determined by the IEEE1394b incompatible device 122.

Alternatively, the determining unit 112 determines whether the information concerning a communication control parameter that is determined or managed by another device on the network 130 is compatible with the network 130 by comparing a communication control parameter that is calculated by the calculating unit 114 described later and the information concerning a communication control parameter that is obtained by the obtaining unit 111. Moreover, the determining unit 112 can be configured to determine that the information concerning a communication control parameter is not compatible with the network 130 when a specific parameter is set as the communication control parameter.

The reporting unit 113 reports a result of the determination by the determining unit 112. Report by the reporting unit 113 can be performed, for example, by the display of a message on a display screen, animation, sound, or the like. Alternatively, the reporting unit 113 can output a control signal to cause another device connected to the network 130 to output a report as described above.

The calculating unit 114 calculates a communication control parameter compatible with the network 130. The calculating unit 114, for example, sends a Ping packet to each device connected to the network 130, and calculates the communication control parameter based on the time required until a Self_ID packet that is transmitted from each device as a response to the Ping packet is received.

The device identifying unit 115 identifies, when the information concerning a communication control parameter is determined to be not compatible with the network 130 by the determining unit 112, the device being the cause thereof. When the device identifying unit 115 identifies the device causing the incompatibility, the reporting unit 113 reports information concerning the device identified by the identifying unit 115. Specifically, for example, a name and an identification number of the device and a message indicating the need for removal of the device are displayed.

The disconnecting unit 116 disconnects the device identified by the device identifying unit 115 from the network 130. The disconnecting unit 116, for example, sends a remote command packet to the device identified by the device identifying unit 115 to stop a port that is connected to other devices.

(Communication Monitoring Process of Communication Monitoring Apparatus 100)

Figure 2:
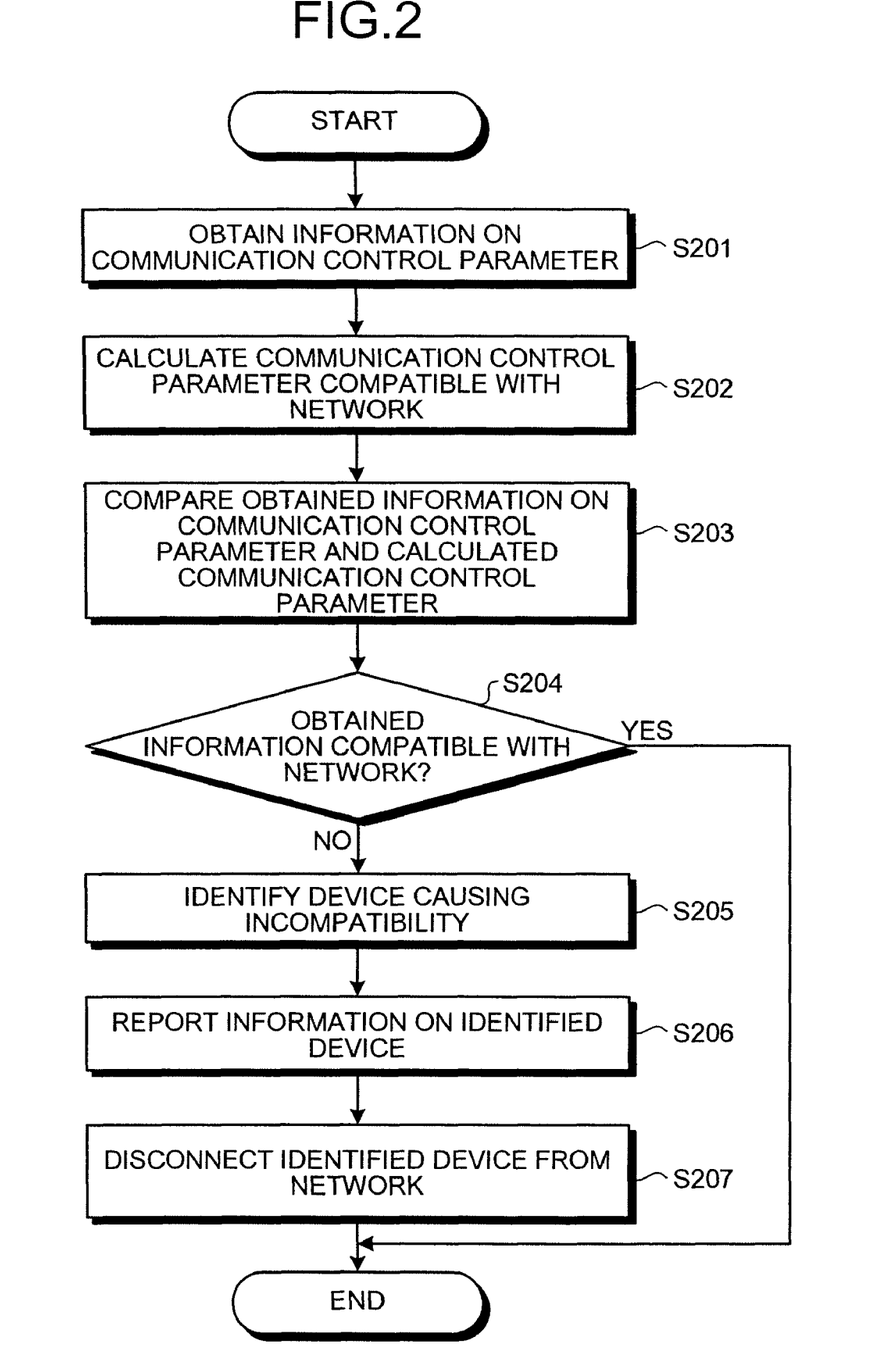
FIG. 2 is a flowchart of a communication monitoring process performed by the communication monitoring apparatus.

FIG. 2 is a flowchart of a communication monitoring process performed by the communication monitoring apparatus. First, the obtaining unit 111 obtains the information concerning a communication control parameter that is determined or managed by another device on the network 130 (step S201). Next, the calculating unit 114 calculates a communication control parameter that is compatible with the network 130 (step S202). The determining unit 112 compares the information concerning a communication control parameter obtained at step S201 and the communication control parameter calculated at step S202 (step S203).

The determining unit 112 determines whether the information concerning a communication control parameter that is determined or managed by another device on the network 130 is compatible with the network 130 based on a result of comparison performed at step S203 (step S204). When it is compatible with the network 130 (step S204: YES), no particular processing is performed, and the process of this flowchart is ended.

On the other hand, when it is not compatible with the network 130 (step S204: NO), the device identifying unit 115 identifies the device being the cause (step S205). The reporting unit 113 reports information concerning the device identified at step S205 (step S206). The identified device is disconnected from the network 130 (step S207), and the process of this flowchart is ended.

As described above, according to the communication monitoring apparatus 100 of the embodiment, it is possible to determine whether information concerning a set communication control parameter is compatible with the network 130, in which a plurality of devices are connected with the IEEE1394 serial bus. If the information concerning a communication control parameter is a Gap_Count value, it is possible to prevent an unstable state of the network 130 or to prevent deterioration of the throughput.

Moreover, when an improper value is set as the communication control parameter, or when there is a possibility of setting an improper value, it is possible to notify a user the fact. Furthermore, when it is determined that the information concerning a communication control parameter is not compatible with the network 130, by reporting the device being the cause of the incompatibility, or by disconnecting the device from the network 130, it is possible to prevent an improper communication control parameter to be set.

EXAMPLE (Components of Communication Monitoring Apparatus)

Figure 3:
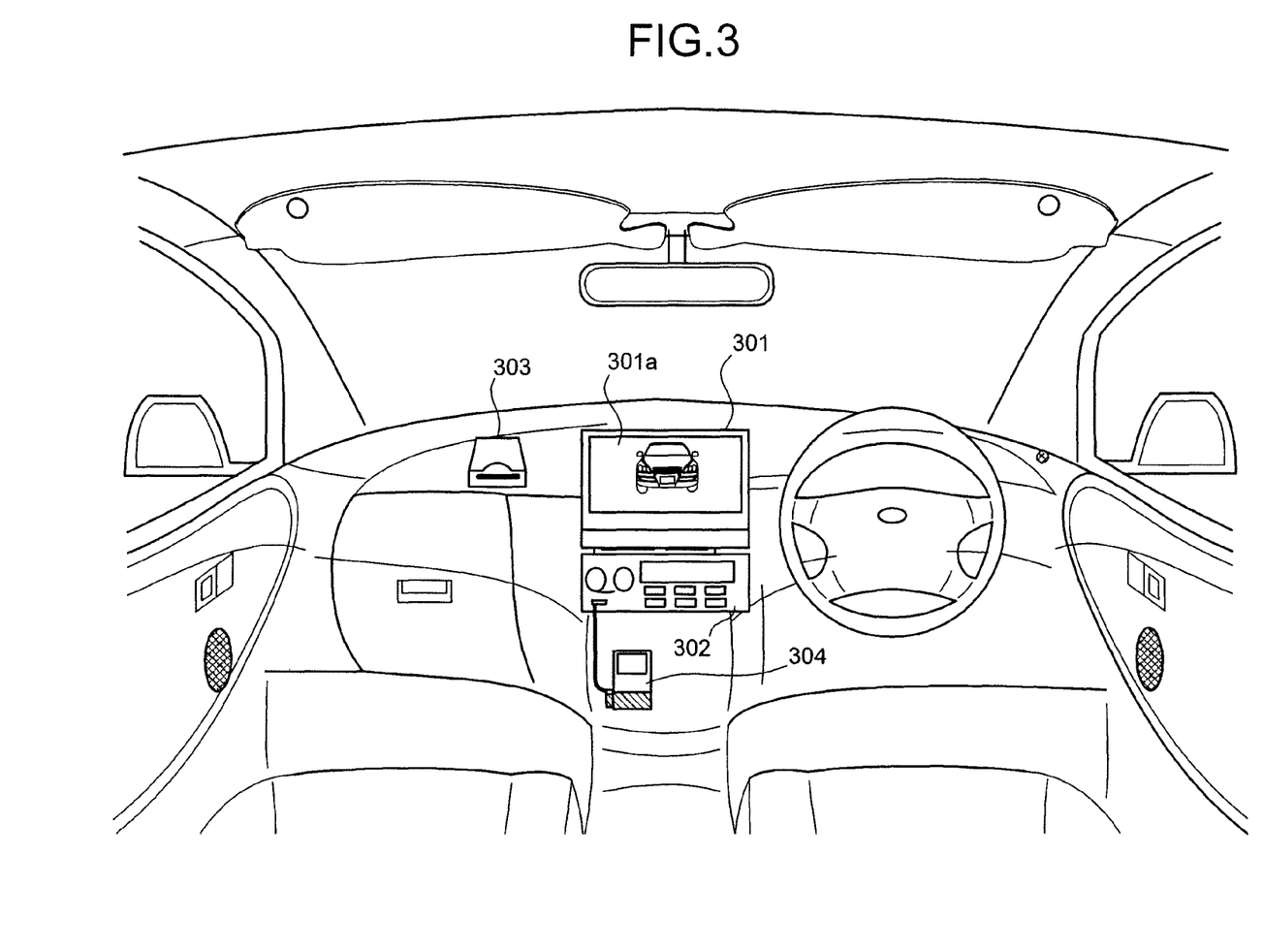
FIG. 3 is a schematic diagram showing devices constituting a network that is monitored by a communication monitoring apparatus according to an example.

FIG. 3 is a schematic diagram showing devices constituting a network that is monitored by a communication monitoring apparatus according to an example. The communication monitoring apparatus according to the example monitors an in-vehicle network that connects devices installed in a vehicle. In the vehicle, a navigation device 301, a car stereo 302, and an ETC unit 303 are installed. In the present example, the communication monitoring apparatus is provided in the navigation device 301. Moreover, the communication control parameter that is monitored by the communication monitoring apparatus is a Gap_Count value.

In the present example, the communication monitoring apparatus monitors the in-vehicle network that connects the navigation device 301, the car stereo 302, and the like. However, the present invention is not limited thereto. For example, the present invention can be applied to a connection between home appliances or a connection between an in-vehicle device and a home appliance as well.

The navigation device 301 includes the communication monitoring apparatus, and monitors a Gap_Count value in the in-vehicle network. Furthermore, the navigation device 301 searches a route to a destination and performs guidance of the route during travel. Moreover, the navigation device 301 includes a recording medium in which map information, information of near-by facilities, and the like are stored, and is capable of storing music data and the like in an unused storage area.

In the example shown, a rearward view from the vehicle is displayed on a display screen 301a of the navigation device 301. The image displayed on the display screen 301a is shot by a rear camera (not shown) that is attached at the rear of the vehicle. A user can confirm safe conditions at the rear of the vehicle using the image captured by the rear camera. The navigation device 301 and the rear camera are connected with the IEEE1394 bus.

The car stereo 302 plays music data that is stored on a CD or an MD, and causes speakers, not shown, to output sound. The ETC unit 303 includes an ETC information processing unit, an ETC card inserting portion, and an antenna, and is used for payment of a toll at a toll gate.

The navigation device 301 and the car stereo 302 are connected to each other with the IEEE1394 bus. This enables the car stereo 302 to play music data that is stored in a storage area in the navigation device 301. Moreover, the navigation device 301 and the ETC unit 303 are connected similarly with the IEEE1394 bus. Thus, the navigation device 301 recognizes the equipment of the ETC unit 303, and can perform route search considering an ETC lane.

Moreover, a portable audio player 304 is connected to the car stereo 302. The portable audio player 304 plays music data that is stored on a hard disk or in a flash memory equipped in the device. Furthermore, by connecting the portable audio player 304 to the car stereo 302, it becomes possible to play, by the car stereo 302, music data that is stored in the portable audio player 304, or to output music that is played by the portable audio player 304 from the speakers of the car stereo 302.

(Network Configuration)

Figure 4:
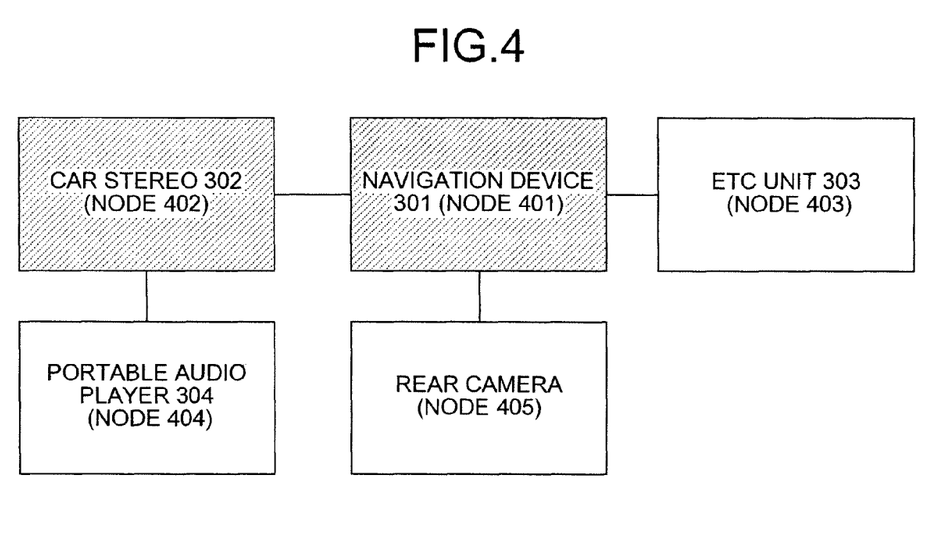
FIG. 4 is a schematic diagram of the network shown in FIG. 3.

FIG. 4 is a schematic diagram of the network shown in FIG. 3. The navigation device 301 is respectively connected to the car stereo 302, the ETC unit 303, and the rear camera. Moreover, the car stereo 302 is connected to the portable audio player 304 in addition to the navigation device 301.

Hereinafter, each device is referred to as a node on the network, and the navigation device 301 corresponds to a node 401, the car stereo 302 corresponds to a node 402, the ETC unit 303 corresponds to a node 403, the portable audio player 304 corresponds to a node 404, and the rear camera corresponds to a node 405. The nodes 401 to 405 are respectively connected with the IEEE1394 bus.

These devices are connected based on the IEEE1394 standard, and the nodes 403, 404, and 405 are nodes (hereinafter, "IEEE1394-1995 nodes or IEEE1394a nodes") based on IEEE1394-1995 or IEEE1394a. On the other hand, the nodes 401 and 402 that are shown with hatching are nodes (hereinafter, "IEEE1394b nodes") based on IEEE1394b. The IEEE1394b is a standard obtained by improving IEEE1394a, and the maximum transfer speed is 800 Mbps (400 Mbps with IEEE1394a). As a cable, an optical fiber, an Ethernet (registered trademark) cable, and the like can be used (metal cable for IEEE1394a). Moreover, the maximum connecting distance is 100 m (4.5 m for IEEE13964a).

As described, IEEE1394b differs from IEEE1394-1995 and IEEE1394a in many points, and the Gap_Count calculation cannot be performed in the same manner as with IEEE1394-1995 and IEEE1394a. As described above, since IEEE1394-1995 and IEEE1394a have such limitations as a cable length of up to 4.5 m and limitations in cable type, a propagation time when data is transmitted with one hop is determined as a fixed value according to the number of hops.

On the other hand, in a 1394 mixed network, the Gap_Count cannot be set according to the number of hops since various lengths and types of cables are used. In this case, the Gap_Count setting node uses a Ping packet and calculates the Gap_Count based on a propagation time of data in the longest path.

Specifically, the Gap_Count setting node transmits a Ping packet to all other nodes. When each node receives the Ping packet from the Gap_Count setting node, each node broadcasts a Self_ID packet. The Gap_Count setting node sets the Gap_Count based on the time required until the Self_ID packet is received from all of the nodes from the time of the transmission of the Ping packet.

In the network configuration shown in FIG. 4, the Gap_Count setting node changes every time a network topology changes. At this time, if a node that is not compatible with IEEE1394b becomes the Gap_Count setting node, the Gap_Count is set without consideration of the IEEE1394b node. Therefore, the network can be unstable due to an improper Gap_Count, or the throughput of the network can be deteriorated.

To prevent such a problem, a monitoring node (communication monitoring apparatus) is provided that monitors whether the Gap_Count that is set by the Gap_Count setting node is appropriately set. The monitoring node is a node that is compatible with IEEE1394b or a node that can perform the Gap_Count calculation using the Ping packet described above. In this example, explanation is given assuming that the Gap_Count setting node is the node 404, which is the IEEE1394a, and that the monitoring node is the node 401, which is the IEEE1394b node.

(Gap_Count Setting Process Performed by Gap_Count Setting Node)

Figure 5:
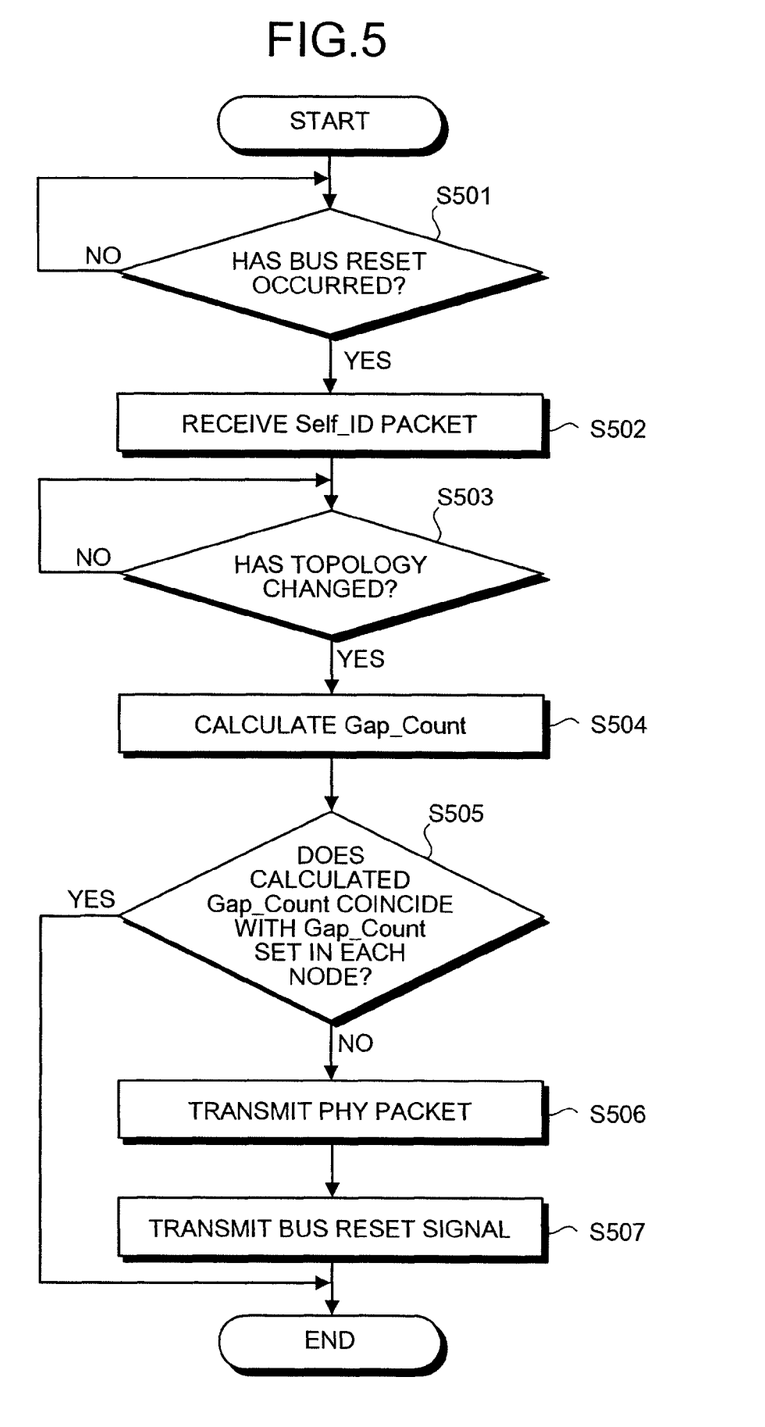
FIG. 5 is a flowchart of a Gap_Count setting process performed by the Gap_Count setting node.

FIG. 5 is a flowchart of a Gap_Count setting process that is performed by the Gap_Count setting node. First, when a bus reset has occurred (step S501: YES), each node transmits a Self_ID packet upon receiving the bus reset signal. The Gap_Count setting node (node 404) receives the Self_ID from each node (step S502). The Gap_Count setting node determines whether there has been a change in the topology on the bus (step S503). When the topology on the bus has changed (step S503: YES), the Gap_Count setting node performs the Gap_Count calculation corresponding to the topology after the change (step S504).

The Gap_Count setting node then determines whether the calculated Gap_Count coincides with a Gap_Count that has been set in each node (step S505). When the calculated Gap_Count coincides with the Gap_Count that has been set in each node (step S505: YES), it is not necessary to re-set the Gap_Count, and therefore, the process of this flowchart is ended.

On the other hand, when the calculated Gap_Count differs from the Gap_Count that has been set in each node (step S505: NO), the Gap_Count is to be re-set. Therefore, the Gap_Count setting node transmits a PHY packet that includes the calculated Gap_Count to each node (step S506). Each node sets the Gap_Count included in the PHY packet in a PHY register. The Gap_Count setting node sends a bus reset signal again (step S507), and the process of this flowchart is ended. By this resent bus reset signal, the Gap_Count set by each node becomes effective.

With the process described above, the Gap_Count setting node performs Gap_Count setting every time the topology on the bus is changed. The Gap_Count calculation performed at step S504 is performed according to a standard with which the Gap_Count setting node is compatible. Therefore, the node 404, which is the IEEE1394a node, performs the Gap_Count calculation without considering presence of the IEEE13964b node on the bus. Therefore, the node 401, which is the monitoring node, monitors Gap_Count by the process described below to prevent an improper Gap_Count from being set.

(Gap_Count Monitoring Process Performed by Monitoring Node)

Figure 6:
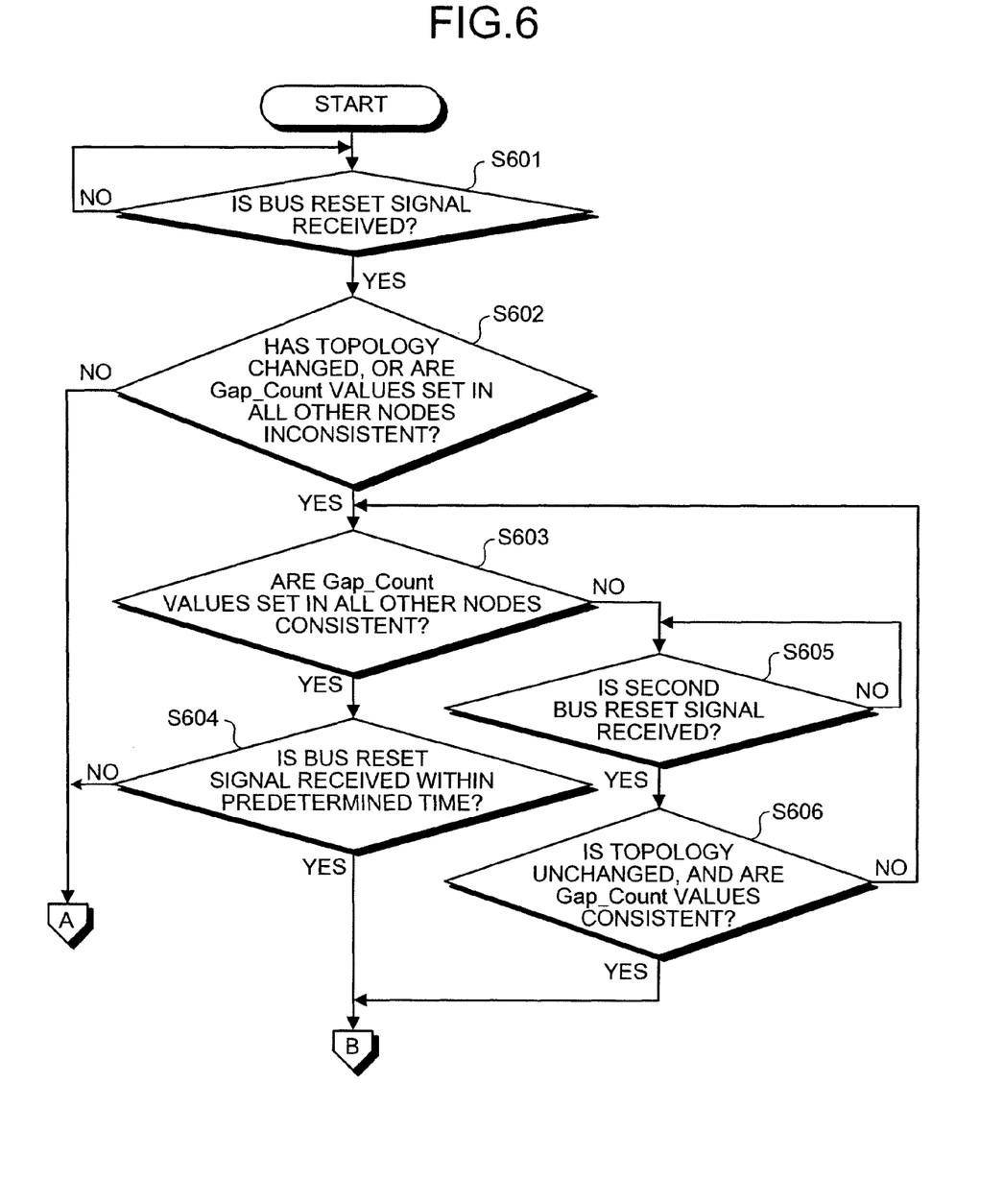
FIG. 6 is a flowchart of a monitoring process performed a monitoring node.
Figure 7:
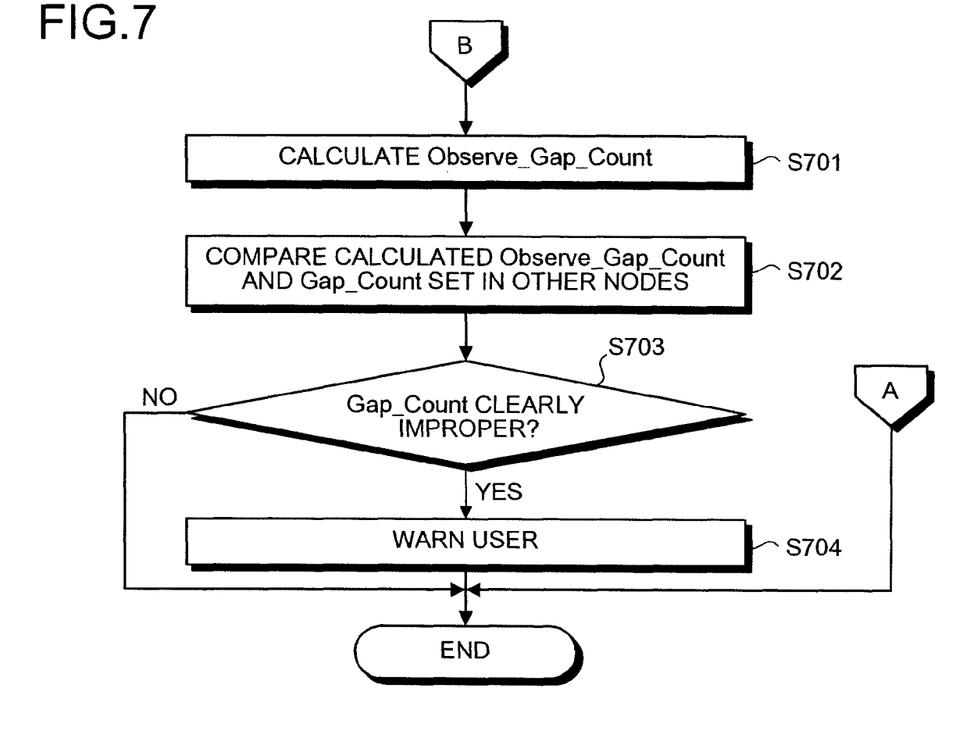
FIG. 7 is a flowchart of a monitoring process performed a monitoring node.

FIGS. 6 and 7 are flowcharts of procedures in a Gap_Count monitoring process performed by the monitoring node. It is preferable that the monitoring process by the monitoring node be performed after the Gap_Count setting node performs the Gap_Count setting. Therefore, the process shown in FIG. 6 is a process of monitoring whether the Gap_Count setting node has performed the Gap_Count setting, and the process shown in FIG. 7 is a process of monitoring whether the Gap_Count set by the Gap_Count setting node is an appropriate value.

First, the monitoring node (node 401) monitors whether a bus reset signal has been received (step S601). Upon receiving the bus reset signal (step S601: YES), the monitoring node determines whether the topology on the bus has changed, or whether the Gap_Count values set in all other nodes are inconsistent (step S602).

When the topology has changed or when the Gap_Count values set in all other nodes are inconsistent (step S602: YES), again consistency of the Gap_Count values set in all other nodes is checked (step S603). On the other hand, when there is no change in the topology, and the Gap_Count values set in all other nodes are consistent (not inconsistent) (step S602: NO), the process proceeds to A in FIG. 7, and the process of this flowchart is ended (see FIG. 7).

Next, at step S603, when the Gap_Count values set in all other nodes are consistent (step S603: YES), it is determined whether a bus reset signal is received within a predetermined time (step S604). Whether the Gap_Count is to be re-set is unknown, hence waiting for the predetermined time occurs. Even if the bus reset occurs, for example, when the Gap_Count that is calculated by the Gap_Count setting node after the bus reset coincides with the Gap_Count that has been set in each node, the Gap_Count is not to be re-set (refer to step S504 in FIG. 5).

When the bus reset signal is received within the predetermined time (step S604: YES), it is determined that the Gap_Count has been re-set, and the process proceeds to B in FIG. 7. On the other hand, when the bus reset signal is not received within the predetermined time (step S604: NO), it is determined that the Gap_Count has not been re-set, and the process proceeds to A in FIG. 7. Thus, the process of this flowchart is ended (see FIG. 7). The waiting time for the bus reset signal is arbitrarily determined ("predetermined time" at step S604), and for example, can be set to 1 second from the reception of the bus reset signal.

The IEEE1394 specification does not specify a period of time by which the Gap_Count must be determined. However, the setting of the Gap_Count is related to an overhead ID that is used when a connection between devices is established. It is specified that when the bus reset occurs, to maintain the connection established before the occurrence of the bus reset, the connection must be reestablished within 1 second after the occurrence of the bus reset. Therefore, it is expected that the Gap_Count is determined within 1 second after the occurrence of the bus reset. Based on this expectation, the waiting time at step S604 is set to 1 second.

Furthermore, for example, after it is determined that the Gap_Count values in all nodes are consistent (step S603: YES), when a Self_ID packet that is transmitted by one of the nodes is received, the process can proceed to B in FIG. 7 after waiting until the Self_ID packets are received from all of the nodes. As described above, when the Gap_Count values set in all other nodes are consistent, whether the Gap_Count is to be re-set is unknown. If the monitoring node receives a Self_ID packet in such a state, it is presumed that the Gap_Count setting node is to perform the Gap_Count calculation using the Ping packet.

The most time-requiring processes in the Gap_Count calculation process is transmission of a Ping packet and a reception of a Self_ID packet. Therefore, if it can be confirmed that the Self_ID packets have been transmitted from all of the nodes, it is possible to presume that the Gap_Count calculation process is soon to be completed, and is possible to start the monitoring process without waiting the predetermined time as in step S604.

Furthermore, for the Gap_Count calculation, it is enough if at least the response time to a leaf node (node at the end) and a branch node (node at a branch) are grasped. Therefore, if it can be confirmed that the Self_ID packets from all leaf nodes and all branch nodes have been received, it is possible to presume that the Gap_Count calculation process is soon to be completed also in the monitoring node.

Next, at step S603, when the Gap_Count values set in all other nodes are not consistent (step S603: NO), reception of a second bus reset signal is waited for (step S605: loop of NO). This is because the bus reset signal to make the Gap_Count set by the PHY packet effective is to be transmitted since the Gap_Count is always re-set when the Gap_Count values set in all other nodes are not consistent.

Upon receiving the second bus reset signal (step S605: YES), it is determined whether there is no change in the topology on the bus and whether the Gap_Count values set in all other nodes are consistent (step S606). When there is no change in the topology on the bus and the Gap_Count values set in all other nodes are consistent (step S606: YES), the bus reset signal received at step S605 is determined to be the bus reset to make the Gap_Count effective, and the process proceeds to B in FIG. 7.

On the other hand, if there is any change in the topology on the bus or when the Gap_Count values set in all other nodes are not consistent (step S606: NO), the bus reset received at step S605 is determined as not the bus reset to make the Gap_Count effective, and the process returns to step S603 to repeat the following processing. The monitoring node checks whether the Gap_Count setting node has performed the Gap_Count setting by the process described above, and proceeds to the process shown in FIG. 7.

Next, the process shown in FIG. 7 (process of monitoring whether a Gap_Count set by the Gap_Count setting node is an appropriate value) is explained. First, the monitoring node calculates an Observe_Gap_Count (step S701). The Observe_Gap_Count is a value calculated for the monitoring node to monitor the Gap_Count setting node, and is calculated by a method (for example, a method using a Ping packet) in which a Gap_Count can be properly acquired even in a 1394 mixed network.

The monitoring node then compares the calculated Observe_Gap_Count and the Gap_Count values set in other nodes (step S702), and determines whether the Gap_Count values set in other nodes are clearly improper (step S703). A criterion to determine a Gap_Count value as clearly improper is not particularly limited. For example, a case in which the difference between the calculated Observe_Gap_Count and the Gap_Count value is larger than a certain value, or a case in which the Gap_Count is smaller than the Observe_Gap_Count, and the like are considered.

When the Gap_Count is clearly improper (step S703: YES), a warning is issued to a user (step S704), and the process of this flowchart is ended. On the other hand, when the Gap_Count is not determined to be clearly improper (step S703: NO), the warning is not issued, and the process of this flowchart is ended.

Example of Warning Display

Figure 8:
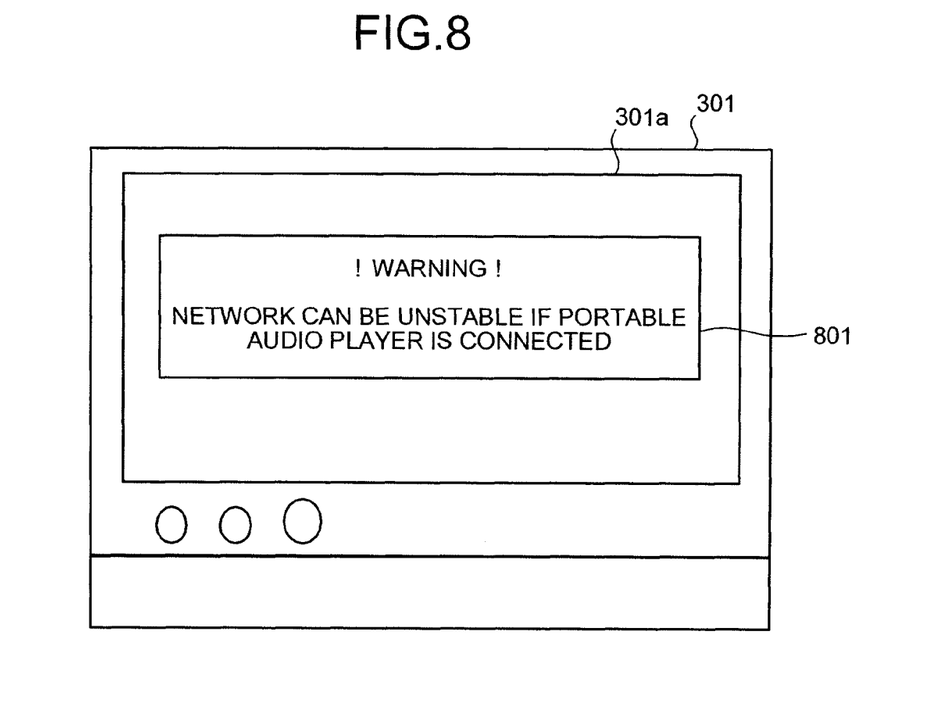
FIG. 8 is a schematic illustrating an example of a display screen that displays a warning to a user.
Figure 9:
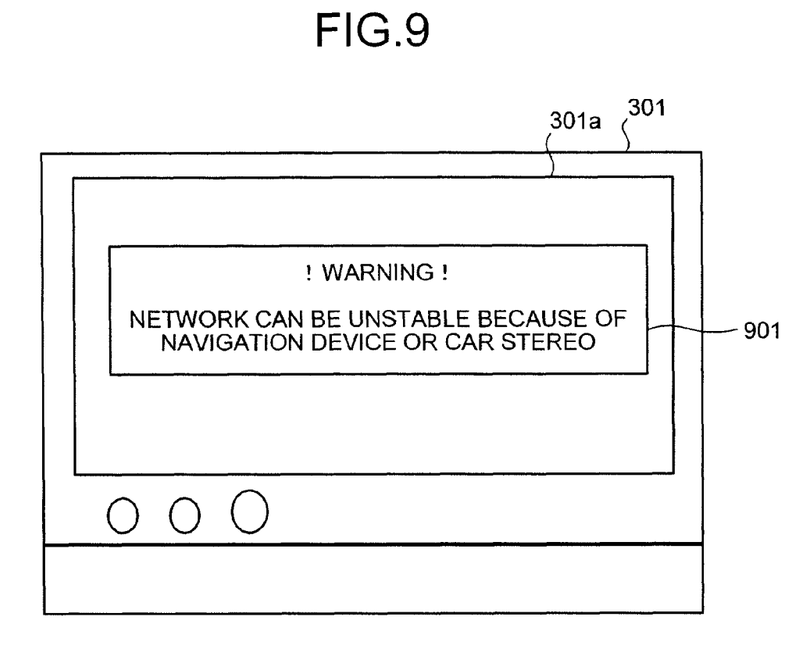
FIG. 9 is a schematic illustrating an example of a display screen that displays a warning to a user.
Figure 10:
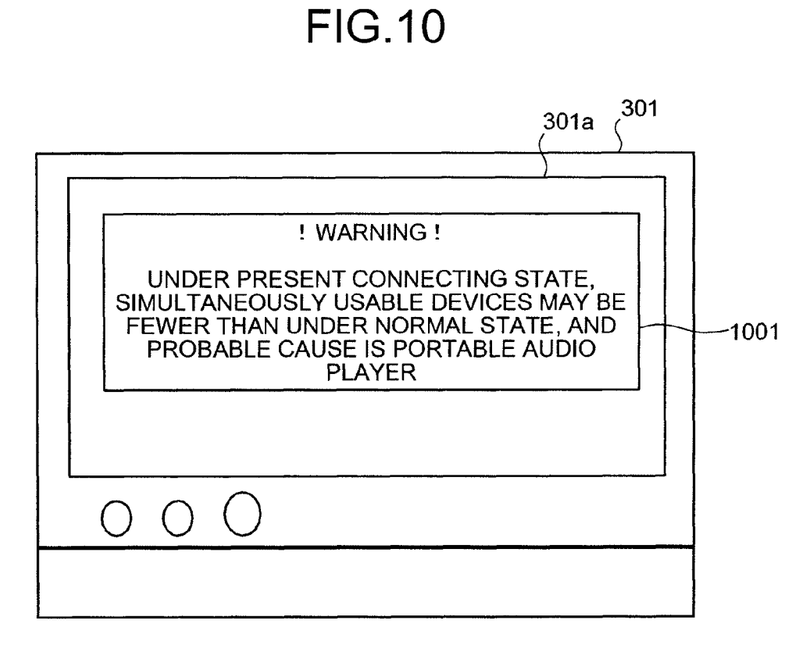
FIG. 10 is a schematic illustrating an example of a display screen that displays a warning to a user.

FIGS. 8 to 10 are examples of a display screen that displays a warning to a user. In the example shown in FIG. 8, a warning display 801 indicating that "network can be unstable if portable audio player is connected" is displayed on the display screen 301a of the node 401 (navigation device 301), which is the monitoring node. Since the node 404 (portable audio player 304) being the Gap_Count setting node is the IEEE1394a node, it is not compatible with the 1394 mixed network. Therefore, a value smaller than a Gap_Count actually required is to be set, and it is displayed that the network can be unstable as a result.

In the example shown in FIG. 9, a warning display 901 indicating that the "network can be unstable because of navigation device or car stereo" is displayed on the display screen 301a. Unlike the example shown in FIG. 8, device names of the node 401 (navigation device 301) and the node 402 (car stereo 302) that are the IEEE1394b node are informed, thereby enabling to configure the network only with the IEEE1394-1995 node and the IEEE1394a node.

In the example shown in FIG. 10, a warning display 1001 indicating that "under present connecting state, simultaneously usable devices may be fewer than under normal state, and probable cause is portable audio player" is displayed. While FIGS. 8 and 9 show an example of a case where a set Gap_Count value is too small, FIG. 10 shows an example of a warning display when a set Gap_Count value is too large.

When the set Gap_Count is too large, the network does not become unstable, and therefore, removal of a device is not required. However, there is a possibility that the throughput of the network is lowered, and this is warned to a user. While in the example shown in the figure, a device name (portable audio player 304) of the node 404 being the Gap_Count setting node is displayed, a device name of the IEEE1394b node can be displayed.

Other than such a warning display by characters on the display screen 301a, a warning can be issued using animation or a drawing, a sound output such as a warning beep and music, by lighting a warning lamp, or the like. Moreover, configuration can be such to output a control signal to cause another device to issue the warning as described above, not issuing the warning by the monitoring node itself. For example, the navigation device 301, which is the monitoring node, can cause the speakers of the car stereo 302 to output a warning sound.

Furthermore, configuration can be such to disconnect a node from the network, when the node that has a possibility of setting an improper Gap_Count becomes the Gap_Count setting node. In IEEE1394, by transmitting a remote command packet, it is possible to stop a port of a desirable node. When a node that has the potential of setting an improper Gap_Count becomes the Gap_Count setting node, the monitoring node transmits the remote command packet to stop a port to which the node and other devices are connected. Thus, communication through the stopped port is disabled and the node that has the potential to set an improper Gap_Count can be disconnected from the network.

For example, when the node 404, which is the IEEE1394a node, becomes the Gap_Count setting node in the network configuration shown in FIG. 4, the node 401, which is the monitoring node, stops the port to which the node 401 is connected among ports of the node 404. This disables communication with devices that are connected subsequent to the node 404; however, a new Gap_Count setting node is determined from the nodes 401, 402, 403, and 405, and it is possible to prevent an improper Gap_Count to be set.

When more than one node that can be the monitoring node is present on the network, it is managed so that only one node becomes the monitoring node. For example, there is a method in which nodes that can be the monitoring node declare start of the monitoring process to other nodes before starting the monitoring process, and a node that declares the start of the monitoring process earliest becomes the monitoring node. Alternatively, such a method can be used that a device identifier is assigned to each node, and the monitoring node is determined according to the device identifier, or the monitoring node is set to the latest device.

Configuration can be such to issue a warning to a user in a shorter time by reducing a process load on the monitoring node. In the example described above, the monitoring node monitors whether the Gap_Count setting node has set a Gap_Count (see FIG. 6), and monitors whether the Gap_Count set by the Gap_Count setting node is an appropriate value (see FIG. 7). Instead of such a process, the following process can be performed.

For example, when the IEEE1394-1995 node or the IEEE1394a node, which is incompatible with IEEE1394b, becomes the Gap_Count setting node, the Gap_Count is set based on a table of the Gap_Count values that are calculated in advance based on the number of hops. Otherwise, the Gap_Count is set to "43", which is the Gap_Count value when the number of hops is the maximum of 16 in the IEEE1394a standard, or is set to 63, which is the maximum value expressed in two-bit width since the Gap_Count is a value in six-bit width.

If such values are set as the Gap_Count, the monitoring node determines that it is an inappropriate value in the 1394 mixed network and issues a warning to a user. Thus, it is not necessary to calculate the Observe_Gap_Count or to compare with Gap_Count values set in other nodes, and the process load on the monitoring node is reduced, thereby enabling to warn a user in a short time.

Alternatively, configuration can be such that when the bus reset occurs, the monitoring node monitors whether a Ping packet is issued by another node before the Gap_Count setting is performed. When a Ping packet is not issued by another node, Ping is not used for the Gap_Count calculation, and it is determined that an improper value for the 1394 mixed network is set. By warning this to a user, the process load on the monitoring node is reduced, thereby enabling to warn a user in a short time.

When it is determined whether the Gap_Count setting is appropriate by the above method, by considering the number of nodes and the topology of the network, a more appropriate warning can be issued. For example, a network connecting in-vehicle devices (hereinafter, "in-vehicle network") is often a closed network, and can be established in a system configuration in which the maximum cable length is fixed. In this case, a propagation time of data between the IEEE1394b nodes can be set as a fixed value.

For example, in a system in which the maximum cable length between the IEEE1394b nodes is 9 meters, the number of hops is regarded as twice as many as that of the IEEE1394-1995 node or the IEEE1394a node whose maximum cable length is 4.5 m. By thus provisionally weighting the hops between the IEEE1394b nodes, even in the 1394 mixed network, the Gap_Count can be calculated based on the number of hops. As described, by taking a configuration of the topology into account, a more accurate warning can be issued.

As described above, with the communication monitoring apparatus according to the example, a Gap_Count value set by the Gap_Count setting node is monitored, it is determined whether the value is an improper value, and if the value is an improper value, a warning is issued to a user. Thus, it is possible to prevent an unstable state of a network in advance.

Moreover, a device name of the Gap_Count setting node that has set the improper Gap_Count or a device name corresponding to an IEEE1394b node being the cause of making the Gap_Count set by the Gap_Count setting node improper is included in information provided at the time of warning, thereby indicating which device is making the network unstable to a user.

As described above, according to the communication monitoring apparatus, the communication monitoring method, the communication monitoring program, and the recording medium, it is possible to prevent an improper communication control parameter to be set.

The communication monitoring method explained in the embodiment can be implemented using a computer, such as personal computer and a work station, to execute a program that is prepared in advance. This program is recorded on a computer-readable recording medium such as a hard disk, a flexible disk, a CD-ROM, an MO, and a DVD, and is executed by the computer reading from the recording medium.

The invention claimed is:

1. A communication monitoring apparatus that monitors a network of a plurality of devices connected with an IEEE1394 serial bus, the communication monitoring apparatus comprising:
   an obtaining unit that obtains a control parameter information that concerns a communication control parameter determined or managed by a device on the network;
   a calculating unit that calculates a communication control parameter that is compatible with the network;
   a determining unit that determines, by comparing the communication control parameter calculated by the calculating unit and the control parameter information, whether the control parameter information is compatible with the network; and
   a reporting unit that reports a result of determination by the determining unit,
   wherein the obtaining unit obtains a Gap_Count value of the network as the control parameter information.

2. The communication monitoring apparatus according to claim 1, wherein the calculating unit transmits a Ping packet to each of the devices on the network, and calculates the communication control parameter based on time required until a Self_ID packet is received from each of the devices as a response to the transmitted Ping packet.

3. The communication monitoring apparatus according to claim 1, wherein
   on the network, at least one device is compatible with IEEE1394b and at least one device is incompatible with IEEE1394b, and
   the determining unit determines that the control parameter information is not compatible with the network when a device that is incompatible with IEEE1394b has determined the communication control parameter.

4. The communication monitoring apparatus according to claim 1, further comprising a device identifying unit that identifies, when the determining unit determines that the control parameter information is not compatible with the network, a device being a cause thereof, wherein
   the reporting unit reports information concerning the device that is identified by the device identifying unit.

5. The communication monitoring apparatus according to claim 1, further comprising:
   a device identifying unit that identifies, when the determining unit determines that the control parameter information is not compatible with the network, a device being a cause thereof;
   a disconnecting unit that disconnects, from the network, the device that is identified by the identifying unit.

6. A communication monitoring apparatus that monitors a network of a plurality of devices connected with an IEEE1394 serial bus, the communication monitoring apparatus comprising:
   an obtaining unit that obtains a control parameter information that concerns a communication control parameter determined or managed by a device on the network;
   a determining unit that determines whether the control parameter information is compatible with the network, wherein
      on the network, at least one device is compatible with IEEE1394b and at least one device is incompatible with IEEE1394b, and
      the determining unit determines that the control parameter information is not compatible with the network when a device that is incompatible with IEEE1394b has determined the communication control parameter; and
   a reporting unit that reports a result of determination by the determining unit, wherein
   the obtaining unit obtains, as the control parameter information, a device information that concerns a device that determines a Gap_Count value of the network.

7. The communication monitoring apparatus according to claim 6, wherein the obtaining unit obtains, as the device information, a device identification information to identify the devices that are on the network.

8. The communication monitoring apparatus according to claim 6, further comprising a device identifying unit that identifies, when the determining unit determines that the control parameter information is not compatible with the network, a device being a cause thereof, wherein
   the reporting unit reports information concerning the device that is identified by the device identifying unit.

9. The communication monitoring apparatus according to claim 6, further comprising:
   a device identifying unit that identifies, when the determining unit determines that the control parameter information is not compatible with the network, a device being a cause thereof;
   a disconnecting unit that disconnects, from the network, the device that is identified by the identifying unit.

10. A communication monitoring method to monitor a network of a plurality of devices connected with an IEEE1394 serial bus, the communication monitoring method comprising:
    obtaining, by a monitoring apparatus, a control parameter information that concerns a communication control parameter determined or managed by a device on the network;
    calculating a communication control parameter that is compatible with the network;
    determining, by comparing the communication control parameter calculated at the calculating and the control parameter information, whether the control parameter information is compatible with the network; and
    reporting a result determined at the determining,
    wherein the obtaining step obtains a Gap_Count value of the network as the control parameter information.

11. A communication monitoring method to monitor a network of a plurality of devices connected with an IEEE1394 serial bus, the communication monitoring method comprising:
    obtaining, by a monitoring apparatus, a control parameter information that concerns a communication control parameter determined or managed by a device on the network;
    determining whether the control parameter information is compatible with the network, wherein
       on the network, at least one device is compatible with IEEE1394b and at least one device is incompatible with IEEE1394b, and
       the determining step comprises determining that the control parameter information is not compatible with the network when a device that is incompatible with IEEE1394b has determined the communication control parameter; and reporting a result determined at the determining, wherein an obtaining unit obtains, as the control parameter information, a device information that concerns a device that determines a Gap_Count value of the network.

12. A non-transitory computer-readable recording medium that stores therein a communication monitoring program that causes a computer to execute:

obtaining a control parameter information that concerns a communication control parameter determined or managed by a device on a network;

calculating a communication control parameter that is compatible with the network;

determining, by comparing the communication control parameter calculated at the calculating and the control parameter information, whether the control parameter information is compatible with the network; and reporting a result determined at the determining, wherein the obtaining step comprises obtaining a Gap_Count value of the network as the control parameter information.

13. A non-transitory computer-readable recording medium that stores therein a communication monitoring program that causes a computer to execute:

obtaining a control parameter information that concerns a communication control parameter determined or managed by a device on a network;

determining whether the control parameter information is compatible with the network, wherein on the network, at least one device is compatible with IEEE1394b and at least one device is incompatible with IEEE1394b, and the determining step comprises determining that the control parameter information is not compatible with the network when a device that is incompatible with IEEE1394b has determined the communication control parameter; and reporting a result determined at the determining, wherein an obtaining unit obtains, as the control parameter information, a device information that concerns a device that determines a Gap_Count value of the network.

* * * * *